Figure 1:
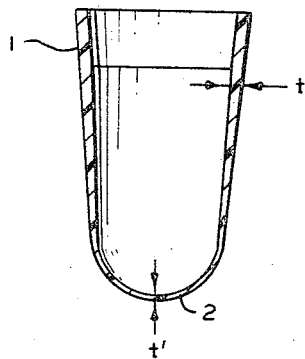

Oct. 17, 1967     C. L. SEEFLUTH     3,347,966

METHOD FOR FORMING BIAXIALLY ORIENTED THERMOPLASTIC ARTICLES

Filed March 4, 1965     2 Sheets-Sheet 1

INVENTOR.
C.L. SEEFLUTH

BY

*Young & Quigg*

ATTORNEYS

Oct. 17, 1967     C. L. SEEFLUTH     3,347,966
METHOD FOR FORMING BIAXIALLY ORIENTED THERMOPLASTIC ARTICLES
Filed March 4, 1965     2 Sheets-Sheet 2

INVENTOR
C. L. SEEFLUTH
BY
*Younger Jugg*
ATTORNEYS

United States Patent Office 3,347,966
Patented Oct. 17, 1967

3,347,966
METHOD FOR FORMING BIAXIALLY ORIENTED THERMOPLASTIC ARTICLES
Charles L. Seefluth, Bartlesville, Okla., assignor to Phillips Petroleum Company, a corporation of Delaware
Filed Mar. 4, 1965, Ser. No. 437,175
6 Claims. (Cl. 264—97)

This invention relates to oriented thermoplastic articles. In one of its aspects, it relates to a method for forming a hollow thermoplastic article comprising forming a parison having an area with a wall thickness less than that of the rest of said parison, heating the parison in a mold to a temperature below the crystalline melt point of the parison, placing the heated parison into an article mold and applying a differential pressure to the parison to cause it to conform to the mold so that the area with thin wall thickness extends first. In a still further aspect, the invention relates to a method for molding an oriented article, the method comprising introducing a pre-formed heated parison having an area of thickness less than that of the rest of the parison into a mold, introducing a differential pressure between the inner part and outer part of said parison so that expansion takes place at the area of decreased thickness first.

Blow molded objects can be formed in two ways. One method is to extrude a parison, place the hot parison into an article mold and blow the parison in the mold. Another method is to extrude a parison of a particular shape, let the parison cool, reheat to a desired temperature, place the reheated parison in an article mold and blow the parison. In the latter method, it is necessary to uniformly heat the parison so that expansion takes place uniformly when the parison is blown. It is also necessary to remove the parison carefully so that no distortion of the parison takes place before the blowing operation. I have now found that a parison can be uniformly heated by placing the same in a mold with a flexible liner of low thermal conductivity. Further, the parison can be easily removed from the heating mold by peeling the flexible liner from the parison.

A problem encountered in blow molding thermoplastic articles, such as bottles, is distributing the material so that the finished article has a wall thickness which is substantially the same throughout. In the case of bottles, the bottom is sometimes thicker than the rest of the bottle and is not oriented. I have now found that an oriented bottom of a bottle having a wall thickness substantially the same throughout can be produced by blowing a pre-heated parison having a tapered, closed end of decreased thickness and withdrawing the blowing means from the mold as the bottle is being blown.

It is, therefore, an object of this invention to provide a novel method for producing an oriented thermoplastic article. It is a further object of this invention to provide a thermoplastic bottle with an oriented bottom having the same thickness throughout.

It is a further object of this invention to provide a method for heating a parison. It is a still further object of this invention to provide an apparatus for heating a parison.

It is a further object of this invention to provide a novel parison for use in blow molding thermoplastic articles.

Other aspects, objects and the several advantages of this invention will be apparent from a study of this disclosure, the drawings and the appended claims.

According to the invention, a parison having a closed end with a wall thickness less than that of the rest of the parison is heated to a temperature just below the crystalline melt point of the parison material, and the parison is placed into a mold and blown. The parison is placed into the mold so that the closed end of the parison is near the wall of the mold. As blowing proceeds, the thin wall area expands first and contacts the mold wall. As blowing proceeds, the mandrel holding the open end of the parison is withdrawn from the mold, thus causing the wall sections to be formed sequentially. The material used for forming the parison can be any thermoplastic material, such as polyethylene, polypropylene, polybutene and copolymers thereof. The preferred themopalstic material is polypropylene. Other suitable thermoplastic materials include polystyrene, polyvinylchloride and copolymers thereof, polyvinyl alcohol and the like.

The crystalline melt point of polymers such as polypropylene and polyethylene can be determined by heating a small piece of plastic (usually film) under crossed polaroids in a microscope equipped with means for heating the polymer. The specimen is heated slowly and the crystalline melting point is the temperature at which birefringence disappears.

Figure 2A:
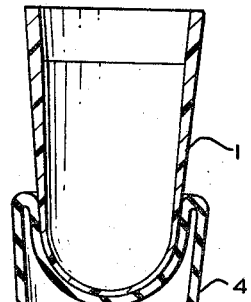

The parison can be heated in a mold which has a high thermal conductivity and which has a flexible liner made of a material, such as rubber, which has a relatively low thermal conductivity but a higher thermal conductivity than that of the parison. After heating to the desired temperature, the parison is pushed out of the mold by applying a fluid pressure to the area between the flexible liner and the mold, thus causing the flexible liner to be peeled from the parison. The invention can be better understood by reference to the accompanying drawings, of which FIGURE 1 is a cross section through a parison according to the invention; FIGURE 2a is a heating apparatus showing heating of the parison, FIGURE 2b is a heating apparatus showing the method of removal of the heated parison; FIGURE 3a and FIGURES 3b, 3c, and 3d show the various stages of blowing the parison according to the invention.

Referring now to FIGURE 1, a parison 1 of thermoplastic material is shown having a closed end 2 and an open end. As previously mentioned, the parison can be composed of any thermoplastic material, such as polyethylene, polypropylene, polybutene and copolymers thereof. The thickness of the closed end 2, T', is less than that of the thickness of the walls T.

Referring now to FIGURES 2a and 2b, mold 3 of high heat conductivity, having a flexible liner 4, defines a shape suitable for heating a parison 1. Mold 3 is provided with electrical resistance elements 5 to provide means for heating the mold to a suitable temperature. Other heating means, such as a circulating fluid of heated material, can be provided instead of the resistance wires 5. A conduit 6 is connected to an air hose 7 which is adapted to provide fluid pressure to be introduced between the flexible liner 4 and the mold 3. In operation, after the parison 1 has been heated to a suitable temperature, fluid pressure is introduced through line 7 and conduit 6 to push the parison out of the mold. As can be seen in FIGURE 2b, the flexible liner 4 is peeled from the parison 1 as the parison is stripped from the mold. The fluid pressure in the area 8 pushes the flexible liner upwardly and, thus, peels the flexible liner from the parison 1.

The flexible liner can be made of rubber or any flexible material which has a higher heat conductivity than the parison and a substantially lower heat conductivity than that of the mold. The mold can be formed of any suitable high heat conductivity material, such as aluminum, carbon steels and stainless steels, and copper.

Figure 3A:
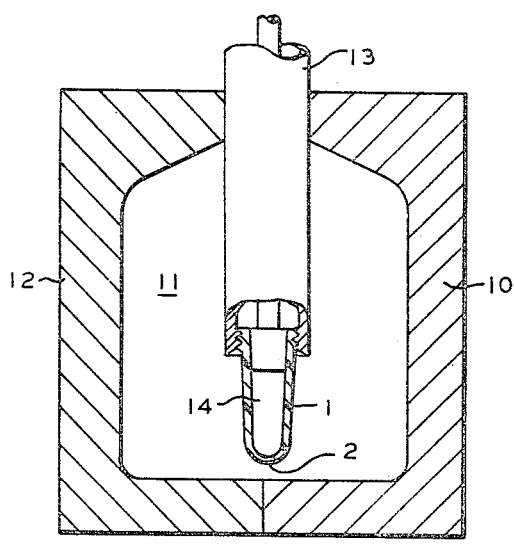
Figure 3B:
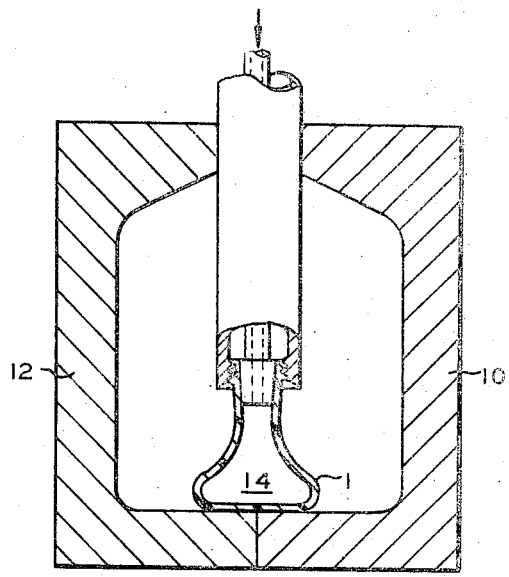
Figure 3C:
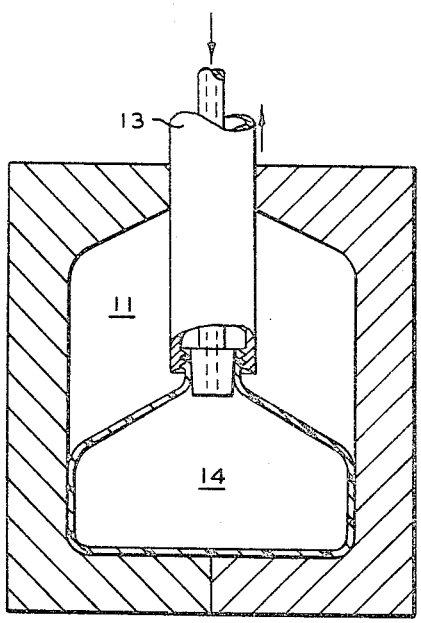
Figure 3D:
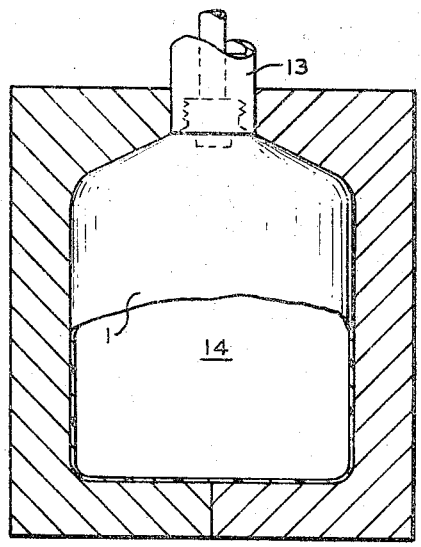

Referring now to FIGURE 3a mold halves 10 and 12 form a suitable mold cavity 11 for a blow molded thermoplastic article. A mandrel 13 holds parison 1 and introduces fluid pressure into the interior 14 of the parison. In operation, a parison 1 having a thinned end portion 2 is held on mandrel 13 and introduced into mold cavity 11. A differential pressure is introduced between parison interior 14 and mold cavity 11, causing the parison to expand. This pressure differential can be introduced by blow molding or vacuum molding. In the case of vacuum molding, suitable vacuum ports (not shown) can be included in the walls of mold halves 10 and 12. The first step of the blowing operation is shown in FIGURE 3b. As the parison 1 begins to expand, the thinned portion 2 expands first and comes into contact with the bottom of the mold cavity. Expansion of the parison 1 then takes place at areas adjacent to those areas in contact with the mold cavity. Thus, the area of thinned wall thickness expands first and those areas adjacent that area of thinned wall section expand next. As shown in FIGURE 3c, the mandrel 13 is withdrawn from the mold as blowing progresses. It can be seen from FIGURE 3c that the sides of the articles are formed sequentially from the bottom to the top. This type of blowing operation produces a highly oriented thermoplastic article. The completely blown article is shown in FIGURE 3d. In FIGURE 3d, the mandrel 13 is completely withdrawn from the mold cavity and the parison 1 has been completely expanded to fill the mold cavity.

*Example*

A parison 3 inches long having one closed hemispherical end .594 inch in outside diameter and .065 inch thick and one open end .848 inch in outside diameter and .057 inch thick, the wall thickness tapering from the open end to a section .111 inch thick about .380 inch from the open end then tapering to the hemispherical end section, and the outside surface smoothly tapering, similar in appearance to that of FIGURE 1, was produced by conventional injection molding from polypropylene having a density of 0.905 gram per cc. and a melt flow (ASTM D1238–57T, Condition L) of 6.5.

Figure 2A:
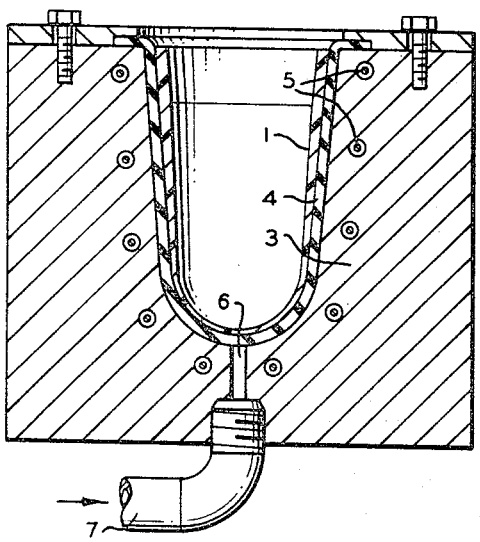
Figure 2B:
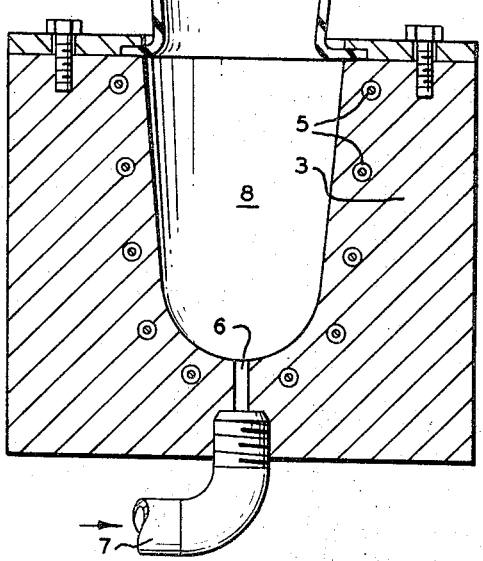

This parison was inserted into a heating device similar to that of FIGURE 2 having a block temperature of 335° F. and was heated for about 3.5 minutes. Air at about 5 p.s.i. pressure was introduced between the block and the liner thus forcing the parison upward and onto a blowing end thread forming mandrel where the threads were formed by clamping and pressing the neck mold member firmly together about the first .5 inch near the top of the parison.

The mandrel held parison, in the vertical position with the threads uppermost, was then enclosed in a 7 ounce bottle mold (a mold for a bottle which has a 7 ounce water capacity) and positioned near the bottom. Air under pressure was admitted to the inside of the parison and simultaneously the mandrel was raised with respect to the mold at a rate corresponding to the development of the blowing parison so as to come to the uppermost position within the mold in about the some time it takes the parison to fully develop into a blown bottle. This occurred in about 6 seconds. Two additional seconds were allowed for the mold to cool the bottle, after which the mold was opened and the bottle removed. The resulting bottle was filled with water, capped, and brought to a temperature of 35° F. and dropped three times onto a concrete surface from a height of 8 feet without breaking or subsequently leaking.

Another such bottle produced from the same polymer and in the same manner as the first was cut into tensile specimens. The wall samples showned tensile strengths varying between 10,000 and 20,000 pounds per square inch as compared to 5000 to 6000 p.s.i. for unoriented polypropylene.

Other bottles made by this same process from this same polymer were judged by several experts in the field of plastic packaging to have exceptional clarity for an unmodified polpropylene bottle.

Samples taken from bottles made by conventional blow molding of the same polymer exhibit tensile strength in the range of unoriented polymer, and such bottles break when filled with water, capped, brought to a temperature of 35° F. and dropped onto a concrete surfaces from a height of 8 feet.

Reasonable variation and modification are possible within the scope of the foregoing disclosure, the drawings and the appended claims to the invention, the essence of which is that a method for forming a biaxially oriented thermoplastic article is provided, the method comprising forming a parison having a closed end and an open end, the parison having a tapered wall thickness from the open end to the closed end, heating said parison in a metal mold having a flexible liner, pushing the parison from the mold by applying fluid pressure between the flexible liner and the mold, placing the heated parison in a hollow mold near one wall thereof, subjecting said parison to fluid pressure between the inner portion of the parison and the inner portion of the hollow mold, and applying the differential pressure so that, as the parison expands, the portion of thinnest wall section expands first and the article is formed by sequentially expanding adjacent wall sections of the parison; that there has been provided a hollow parison having a closed end and an open end, the wall thickness of the closed end being less than the wall thickness of the rest of the parison; and that an apparatus for heating a parison prior to blow molding the same has been provided, the apparatus comprising a mold form of high heat conductivity having substantially the shape of the parison, means for heating the mold to an elevated temperature, a liner in said mold having a heat conductivity less than that of said mold and greater than that of the parison, and means for removing the heated parison from the mold.

I claim:

1. A method for forming a biaxially oriented thermoplastic article comprising forming a parison having a closed end and an open end and being tapered in wall thickness from said open end to said closed end, placing said parison in a heated mold consisting of a rubber-lined metal form having the shape of said parison, heating said parison to a temperature just below the crystalline melt point, introducing fluid pressure between said rubber liner and said mold to push said parison from said mold, removing said parison from said heated mold, placing said heated parison into an article mold with said closed end adjacent one wall of said mold, introducing differential pressure between the inside of said parison and said mold cavity and withdrawing said open end of said parison as expansion of said parison takes place so that said closed end expands, contacts the cavity walls first and said open end contacts said cavity wall last.

2. A method for forming a biaxially oriented thermoplastic article comprising forming a parison having a closed end and an open end, the thickness of said parison being tapered from said open end to said closed end, placing said parison into a heating mold, heating said parison to an orientation temperature of said parison, removing said parison from said heating mold, and placing said heated parison into an article mold, introducing differential pressure between the inside of said parison and said mold cavity, and withdrawing said open end of said parison as sequential expansion of said parison takes place, thus molding said parison into an article having the shape of said article mold.

3. A method according to claim 2 wherein said heating mold consists of a rubber-lined metal form having the shape of said parison and wherein fluid pressure is introduced between said rubber and said mold to force the parison from said mold.

4. A method for blow molding a hollow article having an oriented bottom and oriented sides, said method comprising placing near the bottom of a hollow mold a heated conical parison having an open end and a closed end and being tapered in wall thickness from said open end to said closed end, applying a differential pressure so that expansion of said parison takes place at an area of minimum wall thickness and said parison sequentially expands against said mold walls as expansion continues, and withdrawing said open end away from said bottom of said mold as expansion continues.

5. A method according to claim 4 wherein said parison is pre-heated to a temperature just below the crystalline melt point of said parison.

6. A method according to claim 4 wherein an oriented bottle is sequentially formed from the bottom to the neck.

References Cited
UNITED STATES PATENTS

| | | | |
|---|---|---|---|
| 2,315,478 | 3/1943 | Parkhurst | 264—94 |
| 3,103,170 | 9/1963 | Covington et al. | 264—323 X |
| 3,171,350 | 3/1965 | Metcalf | 264—323 X |
| 3,202,739 | 8/1965 | Zavasnik | 264—94 |

ROBERT F. WHITE, *Primary Examiner.*

A. R. NOE, *Assistant Examiner.*